INVENTOR.
Wilbur Van Tine
Bernard L. Kotyuk
BY

John A. McKinney
ATTORNEY

Aug. 12, 1969  W. VAN TINE ET AL  3,460,856
EXPANSION JOINTS FOR CONDUITS

Original Filed Jan. 2, 1964  2 Sheets-Sheet 2

INVENTOR.
Wilbur Van Tine
Bernard L. Kotyuk
BY
ATTORNEY

United States Patent Office 3,460,856
Patented Aug. 12, 1969

3,460,856
EXPANSION JOINTS FOR CONDUITS
Wilbur Van Tine, North Plainfield, and Bernard L.
Kotyuk, Manville, N.J., assignors to Johns-Manville Corporation, New York, N.Y., a corporation of New York
Continuation of application Ser. No. 335,308, Jan. 2, 1964.
This application Sept. 2, 1966, Ser. No. 577,081
Int. Cl. F16l 59/16, 27/12, 25/00
U.S. Cl. 285—53                              9 Claims This application is a continuation of Ser. No. 335,308, filed Jan. 2, 1964, now abandoned.

This invention relates generally to expansion joints, and is particularly, though not exclusively, concerned with improvements in thermally insulated expansion joints for accommodating lateral movement in conduit installations which are normally subject to temperatures in the order of 400°–1200° F.

The expansible joints generally employed, heretofore, in connection with conduit systems of jet turbines, of oil refinery of "cat" crackers, and the like, where high temperatures are encountered have been of the metallic bellows type. These bellow types of expansible joints ordinarily comprise a tubular member of sheet metal having one or more annular bulges, generally of U shape, comprising lateral extending spaced apart side walls contiguous with the full circumferences of the walls of the tubular members. In some cases the side walls extend perpendicularly away from the walls of the tubular members while in other cases the side walls are arranged to provide acute angle bends as an attempt to increase the capacity of the expansible joint to accommodate itself to deformations caused by relative longitudinal movements of the tubular members. It has also been suggested to provide a sleeve, disposed in an outwardly flared portion of such joints and bridging the space between the sidewalls of the bulge in order to provide a continuous surface or unobstructed pipe line. The rolled U-shape bulge of the known flanges gives them tremendous resistance to lateral deformation. In other words, such expansible joints accommodate longitudinal expansion but resist lateral expansion or displacement. The relatively rigidly fixed lateral arrangement of such joints expose them to rupture and consequent failure when employed in connection with conduit systems where considerable unexpected lateral displacement of one conduit section relative to an adjacent conduit section occurs. In addition, such expansible joints are difficult and expensive to fabricate in the larger sizes, those having a diameter of two feet or more.

It is the principal object of this invention to provide a new and improved expansible joint which will withstand elevated pressures and temperatures and which is characterized by lateral resiliency.

Another object of this invention is to provide an expansible joint embodying a particularly facile and economical construction which is responsive to pressure and thermal changes without rupture.

The foregoing objects and others ancillary thereto are preferably accomplished, in brief, as follows:

A plurality of fibrous felts, each encased in stainless steel mash of preferred diameter wire diameter and of preferred weave, are arranged in generally parallel relation, one to another, to form an inner laminate of flexible insulating material. A plurality of fibrous felts, unencased by metal mesh, form an outer laminate of flexible insulating material. A fluid impervious and flexible cover material, preferably of silicone treated woven asbestos, envelopes the laminates of flexible insulating material. A pair of flange members form the terminal portions of the longitudinal ends of the expansible joints and form means for securing the laminates and the outer weather cover to form a unit. Contingent upon the configuration of the terminal flange members, other secondary terminal flanges may be employed to form means for securing the expansible joint to the terminal portions of the conduit sections being joined. Additionally, an internal sleeve may be secured to the upstream end of the joint to provide means for preventing direct contact of the fluid being transmitted with the inner laminate. This inner sleeve might also define what may be termed a venturi and provides means for increasing the sealing effectiveness of the expansible joint to prevent egress of the transmitted fluid. Further, when the expansible joint is of increased length, the laminates may be additionally supported by a plurality of spring-like finger members extending from the terminal flanges.

Further objects and advantages of this invention will appear from the following description of species thereof and from the accompanying drawings.

FIG. 3 is a schematic representation of a generally rectangular shaped conduit for which the expansion joint of this invention may be adapted to join sections of.

Figure 1:
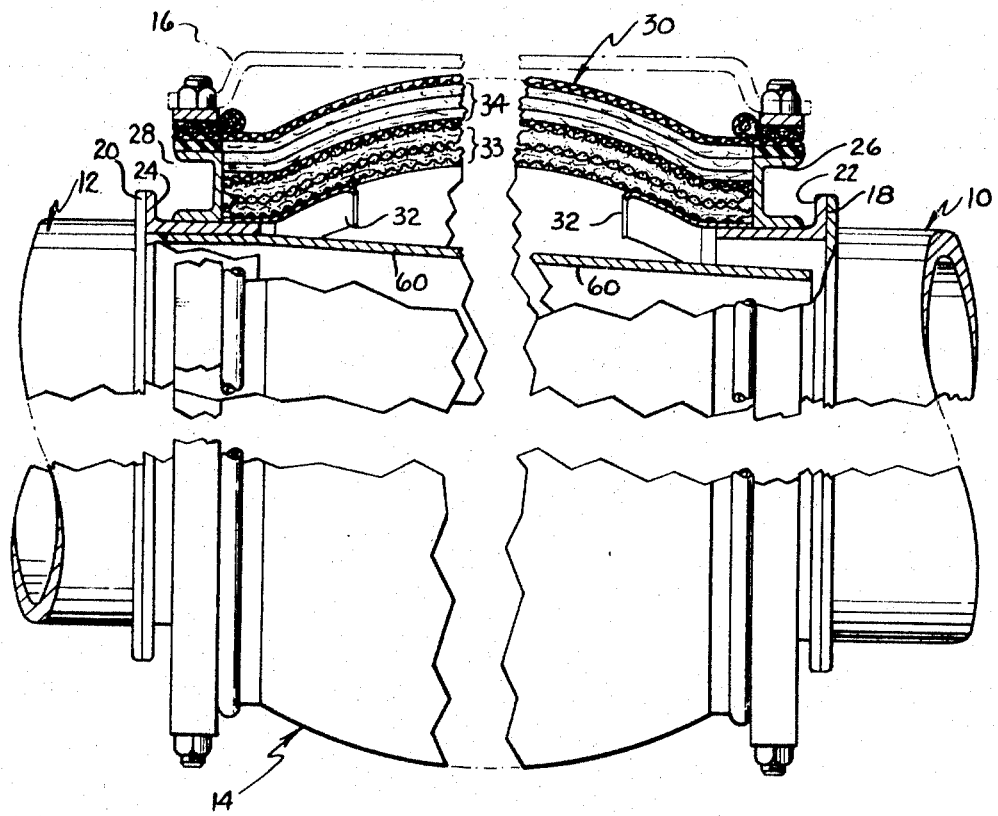
FIG. 1 is a side elevational view of a pair of conduit joined together with the expansion joint of this invention, with a portion "broken away" to show the axial section.

Referring more specifically to the drawing, reference numerals 10 and 12 designate sections of high temperature conduit separated by expansible joint 14. Because expansible joint 14 is flexible and movable in all directions, one or more brackets 16 are provided to maintain the terminal ends 18 and 20 in the desired spaced relation, usually the designed space between the conduits 10 and 12, during shipment. After the expansible joint 14 is installed the brackets 16 are removed and the joint is free to flex in any direction. The manner in which the joint 14 will move or flex will of course be contingent upon the service conditions encountered.

The expansion joint 14, according to a preferred embodiment of this invention, comprises opposite metallic end flanges 22 and 24 which form the terminal ends 18 and 20 respectively and define means for securing the joint 14 to conduits 10 and 12, such as by welding, bolting, or other suitable ways selected by the customer. Adjoining the end flanges 22 and 24 are metallic flanged channel members 26 and 28, respectively, which form means for securing the laminated expansion arch portion 30. A plurality of flexible spring-like metallic fingers 32 may be employed to provide transverse support for and to impart at least initially, the arcuate configuration to the arch portion 30. The arcuate, generally dome, shape provides a flexible arrangement that will compensate for axial movement of the conduits, both toward or away from each other. The portion 30 preferably comprises a plurality of sets 33 and 34 of flexible insulating laminates. The set 33 preferably comprises one or more felts 36 of fibrous material, and most preferably of glass fibers of the substantially quartz type which can withstand temperatures in the order of 2000° F. Each felt 36 is encased in foraminous metal 39 to resist attrition but yet deter heat transfer through joint 14 by conduction. Also the metal 39 is sufficiently thin to render the encasement to be flexed. The metal 39 is preferably of the stainless steel type, commercially known as Inconel, in the form of wire having a diameter in the range of .006–.014 inch knitted or woven in 25 to 60 courses per inch. The foraminous metal may be suitably secured, as by tack welding, to the channels 26 and 28. The set 34 comprises felts 38, which may be of the same material as the felts 36, but which preferably are not encased. Additionally, gas impervious material 40 may be inserted beneath one or more of the felts 36 and 38. The plurality of superimposed insulating mats 36 and 38 provide means for entrapping pockets of stagment gases and also for deterring any channeling effect of gases. The material 40 is preferably woven asbestos cloth having a heat reflective inner surface 42 which may be defined by aluminum foil. The inner surface 42 is the side closer to the interior of the expansion joint 14. The felts 36 and 38 and the heat reflective surface 42 provide means for thermally insulating the outer cover 44, which cover 44 is of heat resistant material such as asbestos treated with silicone. The cover 44 is also fluid impervious, extends over the flanges 46 of channels 26 and 28 for securing thereto in a manner which provides an effective fluid seal against egress of the fluid being conducted in conduits 10 and 12. In those installations where considerable flexing of the cover 44 is anticipated, cushioning material 48 and 50 may be provided to deter cutting of the cover 44 by a flange 46 or clamp bar 52.

The cover 44 also serves as a weather seal for outside installations and the manner in which the cover 44 is attached to the joint 14 permits easy replacement when the cover becomes worn without need for disrupting the remainder of the joint 14. To replace the cover 44, the nuts 54 are removed together with the clamp bars 52; the old cover 44 is removed and a new cover 44, having holes 56 prematched to fit over the bolts 58 extending from the flanges 46, is inserted; and then the clamp bars 52 are replaced and drawn tight by rethreading the nuts 54.

An internal sleeve 60 may be additionally provided to further deter attrition of the insulating felts 36 and 38 by the fluid stream being conveyed through the conduits 10 and 12. The sleeve 60 is cantilever supported at the upstream terminal portion or end of the joint 14 to deter the fluid being conveyed applying positive pressure upon the felt 36 or 38. A further advantage which arises from this arrangement is that in the event a leak should develop in the joint, the conveyed fluid stream, rather than escaping, will more likely inspire the ambient air. The cross-sectional configuration and the area of the sleeve 60 at the upstream end of the joint is preferably the same as the interior of the conduit 12 while the cross-sectional area of the downstream end of the sleeve 60 is somewhat smaller than the corresponding downstream portion of the joint 14 to accommodate lateral displacement of conduit 10 without disrupting the sealing effect of the joint 14.

Figure 2:
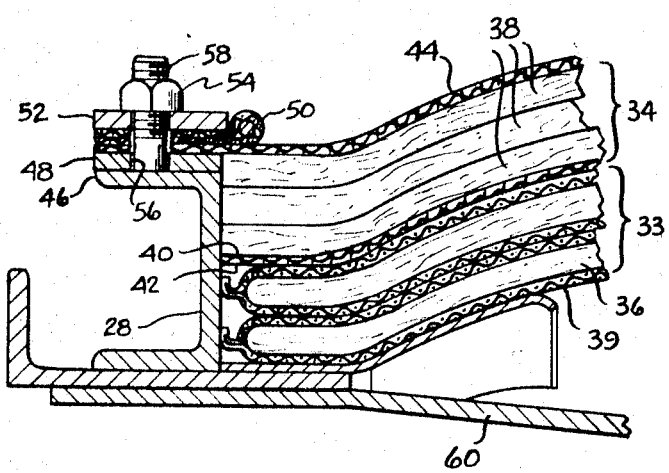
FIG. 2 is an enlarged fragmentary section view of the expansion shown in FIG. 1.
Figure 3:
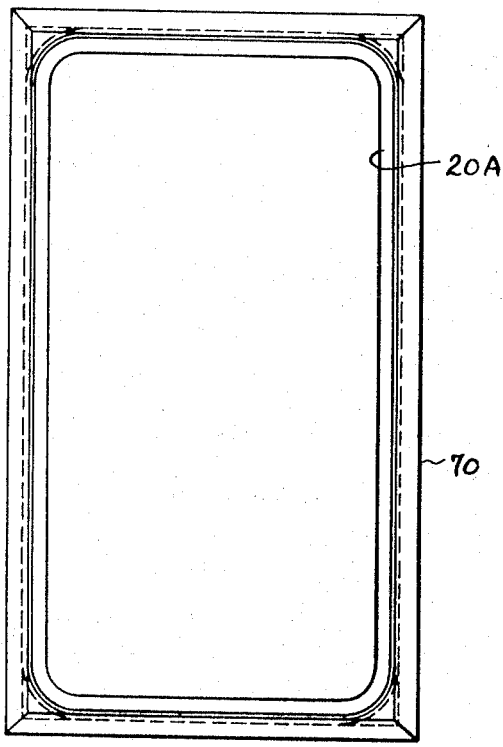
Figure 4:
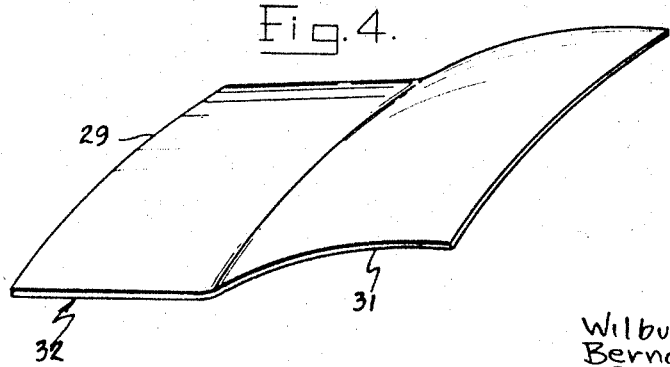
FIG. 4 is an enlarged perspective view of one of the support fingers shown in FIG. 1.

In FIG. 1, the joint 14 is shown in connection with fluid conduits which are generally circular in cross section. However, the joint 14, with suitable modification, is also admirably suited for joining conduits of other cross-sectional configuration. Thus, FIG. 2 would represent a typical axial cross section for joints of any lateral cross-sectional configuration. A generally rectangular form exemplified is by flange 20A in FIG. 3. The flange 20A may be additionally supported by the rectangular superstructure 70. Generally rectangular expansion joints incorporating the features of this invention and having dimensions in the order of 6 feet wide and 10 feet high have been made.

If it is desired to employ a sleeve 60 in connection with joints of polygonal configurations, preferably, the sleeve 60 should be discontinuous to accommodate lateral shift of the joint and also be comprised of a number of elements corresponding at least to the number of sides forming the joint 14.

Other advantages which accrue from the preferred embodiment of the present apparatus include an expansion joint construction that permits axial and lateral movement without straining the supporting conduit members; one which is insulated to protect outside covering from elevated temperatures of the fluid being conveyed; one which is flexible but sufficiently supported to assume a desired and preformed configuration; one which employs fibrous materials in a manner whereby attrition of the fibers is deterred; and one which permits removal of the outermost covering without removal or disruption of the entire joint.

Although certain and specific embodiments of the invention have been shown and described, many modifications thereof are possible. Therefore, this invention is not to be restricted except as necessitated by the prior art and by the spirit of the appended claims.

What we claim is:

1. An expansion joint for joining, and accommodating expansion and contraction of, conduits conveying a relatively hot fluid stream, comprising:
   (a) opposing and longitudinally spaced apart metal terminal portions for securing said joint to said conduits;
   (b) an outer fabric cover of weather resistant material and forming with said terminal portions a fluid tight seal;
   (c) at least one felt formed of inorganic fibers;
   (d) foraminous metal, at least a portion of which is inwardly of said felt, in respect to said joint, and having apertures sufficiently small for said foraminous metal to form attrition deterring means for said felt;
   (e) flexible metallic support means located inwardly, in respect to said joint, of and at least partially supporting said felt; and
   (f) said cover, said felt, and said foraminous metal extending from one to the other of said terminal portions, and at least said foraminous metal and said outer cover being secured to said terminal portions.

2. The joint as described in claim 1 wherein said foraminous metal is in the form of wire mesh woven in the range of 25–60 courses per inch.

3. The joint as described in claim 1, which further comprises:
   a metal sleeve secured to one of said metal terminal portions at the upstream end of said joint, said sleeve having a cross sectional configuration and area at an upstream end thereof corresponding substantially to that of said conduits, and said sleeve having at the downstream end thereof a cross sectional area somewhat less than the cross sectional area of said conduits.

4. The joint as described in claim 1 and wherein said cover is comprised of silicone treated woven asbestos.

5. The joint as described in claim 1 wherein a plurality of flocculent felts are disposed interiorly of said cover and at least the interior most felt is encased in foraminous metal.

6. The joint as described in claim 5 and which further comprises a layer of heat reflective material interposed between an encased and an unencased felt.

7. The joint as described in claim 1 wherein said metallic support means comprises a plurality of finger elements located inwardly, in respect to said joint of said foraminous metal.

8. The joint as described in claim 1 wherein said metallic support means imparts a substantially arcuate form to said felt.

9. An expansion joint for joining, and accommodating expansion and contraction of, conduits conveying a relatively hot fluid stream, comprising:
  (a) opposing and longitudinally spaced apart metal terminal portions for securing said joints to said conduits;
  (b) an outer fabric cover of weather resistant material and forming with said terminal portions a fluid tight seal;
  (c) at least one felt formed of inorganic fibers;
  (d) foraminous metal, at least a portion of which is inwardly of said felt, in respect to said joint, and having apertures sufficiently small for said foraminous metal to form attrition deterring means for said felt;
  (e) a plurality of flexible metallic support elements located inwardly, in respect to said joint, of said foraminous metal and at least partially supporting and imparting a substantially arcuate form to said felt; and
  (f) said cover, said felt, and said foraminous metal extending from one to the other of said terminal portions, and at least said foraminous metal and said outer cover being secured to said terminal portions.

References Cited

UNITED STATES PATENTS

| | | | |
|---|---|---|---|
| 947,046 | 1/1910 | Sugg | 138—138 |
| 1,263,953 | 4/1918 | Smyth | 285—229 |
| 2,261,948 | 11/1941 | Beach | 285—236 X |
| 2,312,282 | 2/1943 | Reet | 138—137 |
| 2,742,384 | 4/1956 | Burleson | 285—47 X |
| 2,807,480 | 9/1957 | Hughes et al. | 285—235 X |
| 2,886,885 | 5/1959 | Reid | 285—226 X |
| 3,123,102 | 3/1964 | Frieder et al. | 285—125 |

FOREIGN PATENTS

| | | |
|---|---|---|
| 8,937 | 7/1886 | Great Britain. |
| 763,972 | 12/1956 | Great Britain. |

CARL W. TOMLIN, Primary Examiner

DAVE W. AROLA, Assistant Examiner

U.S. Cl. X.R.

138—137; 285—55, 236, 300, 423